United States Patent
Tsuchida et al.

(10) Patent No.: US 10,027,191 B2
(45) Date of Patent: Jul. 17, 2018

(54) COMPRESSOR, HEAT PUMP DEVICE, AIR CONDITIONER, AND FREEZING MACHINE

(71) Applicants: Kazuchika Tsuchida, Tokyo (JP); Osamu Kazama, Tokyo (JP)

(72) Inventors: Kazuchika Tsuchida, Tokyo (JP); Osamu Kazama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 281 days.

(21) Appl. No.: 14/652,891

(22) PCT Filed: Dec. 21, 2012

(86) PCT No.: PCT/JP2012/083302
§ 371 (c)(1),
(2) Date: Jun. 17, 2015

(87) PCT Pub. No.: WO2014/097478
PCT Pub. Date: Jun. 26, 2014

(65) Prior Publication Data
US 2015/0333582 A1    Nov. 19, 2015

(51) Int. Cl.
*H02K 1/27* (2006.01)
*F25B 31/02* (2006.01)
(Continued)

(52) U.S. Cl.
CPC ........... *H02K 1/276* (2013.01); *F04C 15/008* (2013.01); *F25B 13/00* (2013.01); *F25B 31/023* (2013.01); *F25B 40/00* (2013.01); *H02K 7/04* (2013.01); *F04C 2240/807* (2013.01); *F25B 2400/13* (2013.01); *F25B 2500/12* (2013.01); *F25B 2500/13* (2013.01); *F25B 2600/021* (2013.01); *Y02B 30/741* (2013.01)

(58) Field of Classification Search
CPC ............................. H02K 1/276; F25B 31/123
See application file for complete search history.

(56) References Cited

U.S. PATENT DOCUMENTS

| 5,227,704 A * | 7/1993 | Erdman | D06F 37/304 |
| | | | 318/400.29 |
| 5,677,587 A | 10/1997 | Sakashita et al. | |
| 2013/0181566 A1 * | 7/2013 | Kim | H02K 1/276 |
| | | | 310/156.49 |

FOREIGN PATENT DOCUMENTS

| JP | 1-113558 U | 7/1989 |
| JP | 06-060269 U | 8/1994 |

(Continued)

OTHER PUBLICATIONS

Office Action dated May 10, 2016 issued in corresponding JP patent application No. 2014-552860 (and English translation).
(Continued)

*Primary Examiner* — Patrick Hamo
(74) *Attorney, Agent, or Firm* — Posz Law Group, PLC

(57) ABSTRACT

A compressor includes: a motor that includes a rotor including opposed magnets; a compression unit that compresses a refrigerant; and a crankshaft that is connected to the motor and the compression unit and is configured to transmit rotational driving of the motor to the compression unit, wherein the magnets are arranged such that the difference in magnetic force between the opposed magnets eliminates a force that deflects the crankshaft when the motor is rotationally driven.

6 Claims, 7 Drawing Sheets

(51) Int. Cl.
*H02K 7/04* (2006.01)
*F04C 15/00* (2006.01)
*F25B 13/00* (2006.01)
*F25B 40/00* (2006.01)

(56) References Cited

FOREIGN PATENT DOCUMENTS

| | | |
|---|---|---|
| JP | 2000-134882 A | 5/2000 |
| JP | 2007-097293 A | 4/2007 |
| JP | 2011-101544 A | 5/2011 |

OTHER PUBLICATIONS

International Search Report of the International Searching Authority dated Mar. 19, 2013 for the corresponding international application No. PCT/JP2012/083302 (and English translation).

\* cited by examiner

COMPRESSOR, HEAT PUMP DEVICE, AIR CONDITIONER, AND FREEZING MACHINE

CROSS REFERENCE TO RELATED APPLICATION

This application is a U.S. national stage application of International Patent Application No. PCT/JP2012/083302 filed on Dec. 21, 2012, the disclosure of which is incorporated herein by reference.

TECHNICAL FIELD

The present invention relates to a compressor, a heat pump device, an air conditioner, and a freezing machine.

BACKGROUND

Conventional motors in compressors used in heat pump devices and the like have high torque when compressing a refrigerant and have low torque when discharging a compressed high-pressure refrigerant; therefore, torque variation (load change) occurs. Due to the occurrence of such torque variation, deflection of the shaft occurs and thus vibration and noise are generated when the compressor is operating.

In order to suppress such vibration and noise, balance weights have been arranged on the end portions of the rotor of the motor. With the balance weights, the force acting on the entire rotating portion is balanced so that the deflection of the shaft due to the compression of the refrigerant is eliminated, thereby suppressing vibration and noise generated when the compressor is operating.

In contrast, a motor with no such balance weights has been developed. For example, a technology is disclosed in Patent Literature 1 in which the motor has a configuration in which, in order to eliminate balance weights that suppress the load change of the motor, one of the opposed permanent magnets generates a magnetomotive force larger than that of the other of the opposed permanent magnets and the air gap between the stator and one of the opposed permanent magnets is made larger than the air gap between the stator and the other of the opposed permanent magnets.

PATENT LITERATURE

Patent Literature 1: Japanese Patent Application Laid-Open No. 2011-101544

However, with the above conventional technology, the air gap increases; therefore, the amount of effective magnetic flux is reduced.

SUMMARY

The present invention has been achieved in view of the above and an object of the present invention is to obtain a compressor capable of balancing the force acting on the entire rotating portion even without a balance weight while suppressing a reduction in the amount of effective magnetic flux.

In order to solve the above problems and achieve the object, an aspect of the present invention is a compressor including: a motor that includes a rotor including opposed magnets; a compression unit that compresses a refrigerant; and a crankshaft that is connected to the motor and the compression unit and is configured to transmit rotational driving of the motor to the compression unit, wherein the magnets are arranged such that a difference in magnetic force between the opposed magnets eliminates a force that deflects the crankshaft when the motor is rotationally driven.

According to the present invention, an effect is obtained where it is possible to obtain a compressor that is capable of balancing the force acting on the entire rotating portion even without a balance weight while suppressing a reduction in the amount of effective magnetic flux and that suppresses vibration and noise when it is operating.

BRIEF DESCRIPTION OF DRAWINGS

FIG. 6-1 is a diagram illustrating a cross-sectional view taken along lines A1-A2 and D1-D2 in FIG. 5 according to the third embodiment.

FIG. 6-2 is a diagram illustrating a cross-sectional view taken along lines B1-B2 and C1-C2 in FIG. 5 according to the third embodiment.

FIG. 8-1 is a diagram illustrating an example of the configuration of an apparatus that includes the heat pump device according to the fourth embodiment during a heating operation.

FIG. 8-2 is a diagram illustrating an example of the configuration of an apparatus that includes the heat pump device according to the fourth embodiment during a cooling operation.

DETAILED DESCRIPTION

Exemplary embodiments of a heat pump device according to the present invention will be explained below in detail with reference to the drawings. This invention is not limited to the embodiments.

First Embodiment

In the present embodiment, the configuration of a compressor according to the present invention will be explained with reference to FIG. 1 to FIG. 3.

Figure 1:
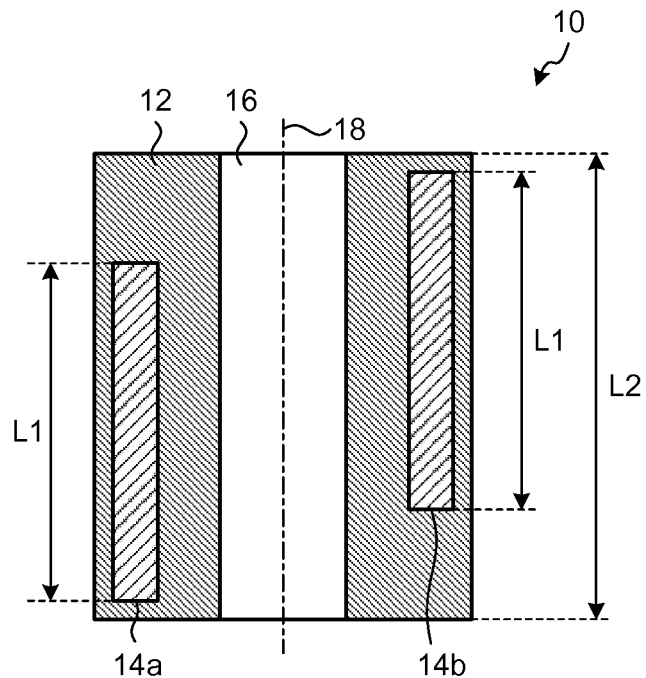
FIG. 1 is a diagram illustrating a side cross-sectional view of a rotor according to a first embodiment.

FIG. 1 is a diagram illustrating a side cross-sectional view of a rotor 10 in a first embodiment of a hermetic compressor according to the present invention. The rotor 10 illustrated in FIG. 1 includes a rotor core 12, magnets 14a and 14b, and a bearing unit 16, and has a rotation axis 18 as a rotation axis.

The magnets 14a and 14b are inserted into the rotor core 12. The magnets 14a and 14b are arranged to oppose each other with the bearing unit 16 therebetween. The length L1 of the magnets 14a and 14b in a direction parallel to the rotation axis 18 is smaller than the length L2 of the rotor core 12 in a direction parallel to the rotation axis 18. The magnets 14a and 14b are inserted into the rotor core 12 such that they are displaced in the directions that are parallel to the rotation axis 18 and are opposite each other (directions that are different from each other by 180 degrees). In other words, the magnets 14a and 14b, which oppose each other, are inserted into the rotor core 12 such that they are arranged to be displaced from each other in a direction parallel to the rotation axis 18 and thus the magnet 14a has a portion that does not overlap with the magnet 14b and the magnet 14b has a portion that does not overlap with the magnet 14a in a direction perpendicular to the rotation axis 18. The magnets 14a and 14b are arranged to be displaced from each other in such a manner; therefore, the magnetic field becomes imbalanced in a direction perpendicular to the rotation axis 18 of the rotor 10. By making the magnetic field imbalanced in such a manner and thereby making the force that deflects the shaft and the difference between the magnetic forces act in opposite directions and equal to each other, the crankshaft can be prevented from being deflected when the rotor 10 is rotationally driven; therefore, the force acting on the entire rotating portion can be balanced.

A shaft connected to the rotor 10 is arranged in the bearing unit 16 such that its center coincides with the rotation axis 18.

Figure 2:
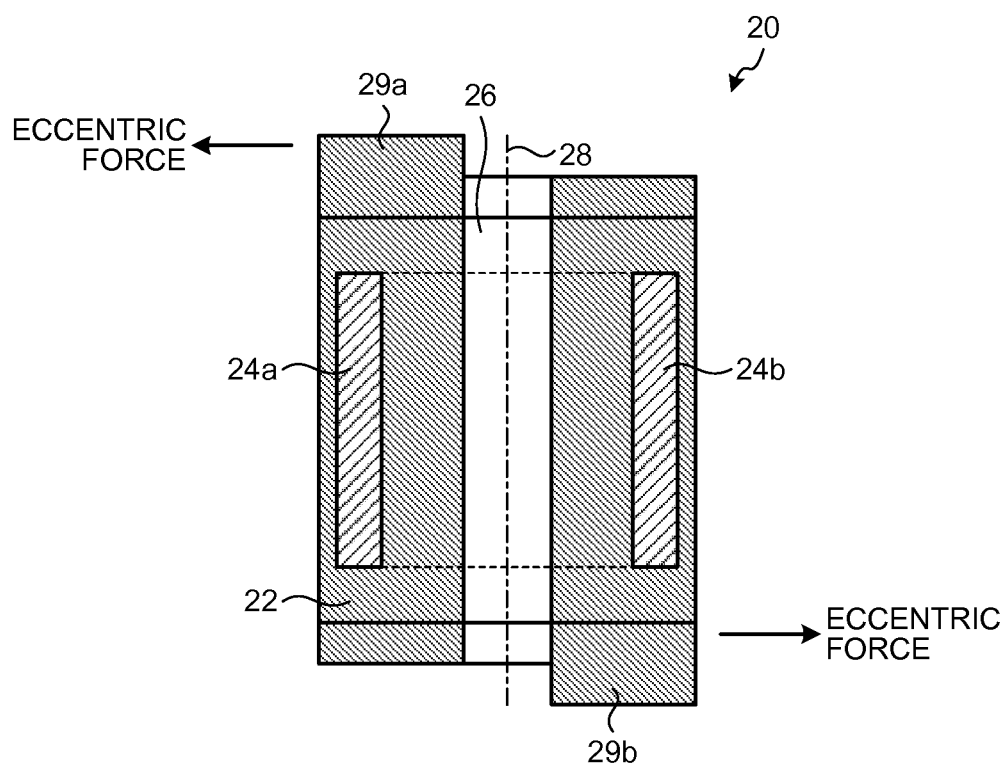
FIG. 2 is a diagram illustrating a side cross-sectional view of a conventional rotor.

FIG. 2 is a diagram illustrating a side cross-sectional view of a conventional rotor 20 of a hermetic compressor. The rotor 20 illustrated in FIG. 2 includes a rotor core 22, magnets 24a and 24b, a bearing unit 26, and balance weights 29a and 29b, and has a rotation axis 28 as a rotation axis.

The magnets 24a and 24b are inserted into the rotor core 22. A shaft connected to the rotor 20 is arranged in the bearing unit 26 such that its center coincides with the rotation axis 28.

The balance weights 29a and 29b are respectively arranged on different end portions of the rotor 20. By arranging a pair of the balance weights 29a and 29b in such a manner, the shaft is prevented from being deflected when a refrigerant is compressed, thereby suppressing vibration and noise generated by torque variation.

Any material having a large specific gravity and low magnetic permeability is used as the material of the balance weights 29a and 29b. Examples of such materials include brass. Brass is, however, a relatively expensive material; therefore, provision of the balance weights 29a and 29b becomes a factor that inhibits cost reduction and also a factor that inhibits saving of resources.

In response to this problem, as illustrated in FIG. 1, the rotor 10 is configured such that the magnets 14a and 14b are arranged to be displaced from each other in a direction parallel to the rotation axis 18 and thus the magnet 14a includes a portion that does not overlap with the magnet 14b and the magnet 14b includes a portion that does not overlap with the magnet 14a in a direction perpendicular to the rotation axis 18. By making the magnetic field imbalanced in such a manner and thereby making the force that deflects the shaft and the difference between the magnetic forces act in opposite directions and equal to each other, the shaft can be prevented from being deflected; therefore, vibration and noise generated by torque variation can be suppressed.

The amount of displacement between the magnets 14a and 14b can be determined in accordance with the pre-measured load that acts on the shaft when the motor is rotationally driven. In other words, it is sufficient if the difference between the magnetic forces, which is caused because of the displacement between the magnets 14a and 14b, and the force that deflects the shaft when the motor is rotationally driven act in opposite directions and are equal to each other and the difference between the magnetic forces is equal to the load caused by the balance weights in FIG. 2.

Furthermore, even with the configuration illustrated in FIG. 1, the air gap does not increase; therefore, vibration and noise can be suppressed while suppressing a reduction in the amount of effective magnetic flux.

Figure 3:
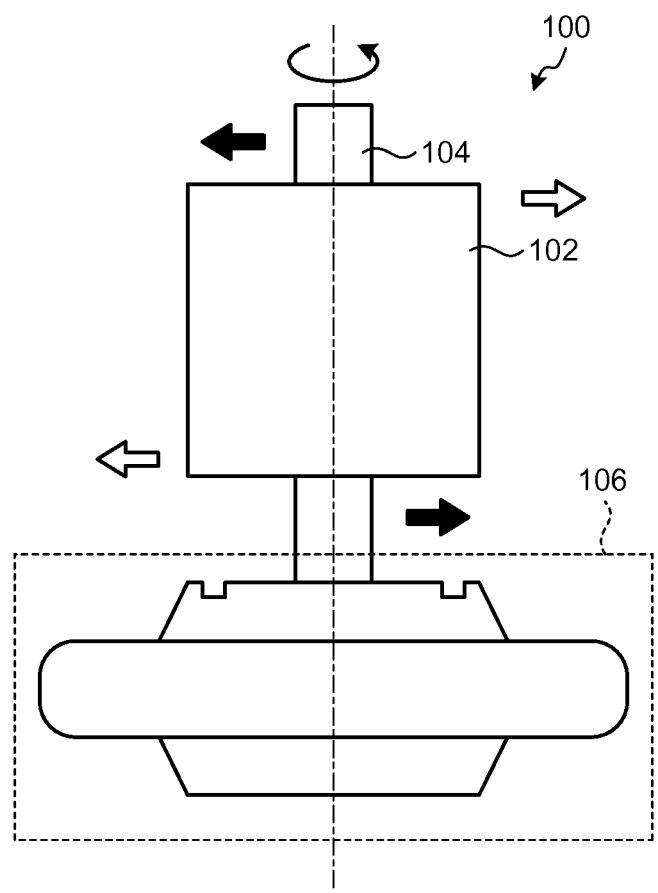
FIG. 3 is a model diagram illustrating a compressor including the rotor according to the first embodiment.

FIG. 3 is a model diagram illustrating a rotary compressor 100 that is an example to which the present invention can be applied. The compressor 100 includes therein a motor 102 and a compression unit 106. The compression unit 106 compresses a refrigerant and the motor 102 includes the rotor 10 illustrated in FIG. 1. As illustrated in FIG. 3, the rotational driving of the motor 102 is transmitted to the compression unit 106 via a crankshaft 104, whereby the refrigerant is compressed. At this point, the force (black arrows) that deflects the crankshaft 104 is generated; however, the difference between the magnetic forces (white arrows) acts in a direction opposite to the force that deflects the crankshaft 104 by applying the present invention. Consequently, the crankshaft 104 can be prevented from being deflected.

As described above, according to the present embodiment, it is possible to obtain a compressor in which the force acting on the entire rotating portion can be balanced even without a balance weight while suppressing a reduction in the amount of effective magnetic flux and thus vibration and noise when it is operating can be suppressed. Moreover, because a balance weight is not provided, cost reduction and saving of resources can be realized.

Second Embodiment

In the present embodiment, the configuration of the compressor in the present invention will be explained with reference to FIG. 4.

Figure 4:
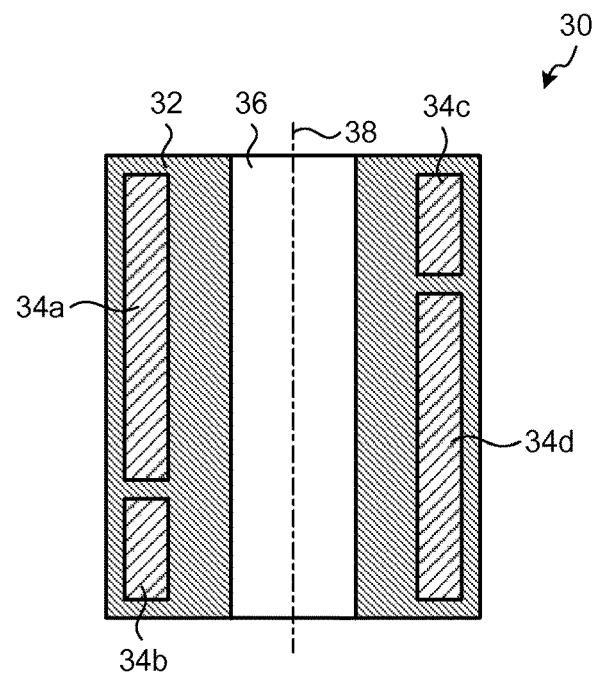
FIG. 4 is a diagram illustrating a side cross-sectional view of a rotor according to a second embodiment.

FIG. 4 is a diagram illustrating a side cross-sectional view of a rotor 30 in a second embodiment of the hermetic compressor according to the present invention. The rotor 30 illustrated in FIG. 4 includes a rotor core 32, magnets 34a to 34d, and a bearing unit 36, and has a rotation axis 38 as a rotation axis.

The magnets 34a to 34d are inserted into the rotor core 32. The magnets 34a and 34b and the magnets 34c and 34d are arranged to oppose each other with the bearing unit 36 therebetween. The magnet 34a is longer than the magnet 34b in a direction parallel to the rotation axis 38 and the magnet 34d is longer than the magnet 34c in a direction parallel to the rotation axis 38. The magnet 34a is arranged to oppose a part of the magnet 34d and the magnet 34c and the magnet 34b is arranged to oppose a part of the magnet 34d. A shaft connected to the rotor 30 is arranged in the bearing unit 36 such that its center coincides with the rotation axis 38.

The magnetic forces of the magnets 34b and 34c are made higher than those of the magnets 34a and 34d. The magnetic forces of the opposed magnets are made different from each other in such a manner; therefore, a high attractive force or repulsive force acts on the portion of a magnet having a low magnetic force opposing a magnet having a high magnetic force; therefore, the magnetic field becomes imbalanced in a direction perpendicular to the rotation axis 38 of the rotor 30. By making the magnetic field imbalanced in such a manner and thereby making the difference between the magnetic forces and the difference between the forces that deflect the shaft arranged in the bearing unit 36 equal to each other, the deflection generated when the rotor 30 is rotationally driven can be eliminated and thus the force acting on the entire rotating portion can be balanced. Therefore, the shaft can be prevented from being deflected when a refrigerant is compressed while suppressing a reduction in the amount of effective magnetic flux and thus vibration and noise generated by torque variation can be suppressed.

Examples of the magnet having a high magnetic force include a neodymium magnet and examples of the magnet having a low magnetic force include an isotropic ferrite magnet.

Specific positions at which the magnets 34a to 34d are arranged can be determined in accordance with the load acting on the shaft when the motor is rotationally driven.

As described above, according to the present embodiment, it is possible to obtain a compressor in which the force acting on the entire rotating portion can be balanced even without a balance weight while suppressing a reduction in the amount of effective magnetic flux and thus vibration and noise when it is operating can be suppressed. Moreover, because a balance weight is not provided, cost reduction and saving of resources can be realized.

Third Embodiment

In the present embodiment, the configuration of the compressor in the present invention will be explained with reference to FIG. 5 to FIG. 6-2.

Figure 5:
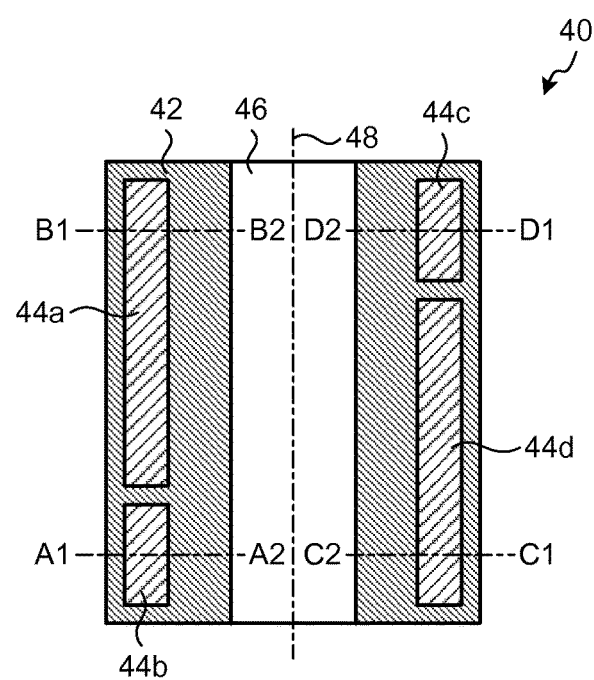
FIG. 5 is a diagram illustrating a side cross-sectional view of a rotor according to a third embodiment.

FIG. 5 is a diagram illustrating a side cross-sectional view of a rotor 40 in a third embodiment of the hermetic compressor according to the present invention. The rotor 40 illustrated in FIG. 5 includes a rotor core 42, magnets 44a to 44d, and a bearing unit 46.

The magnets 44a to 44d are inserted into the rotor core 42. The magnets 44a and 44b and the magnets 44c and 44d are arranged to oppose each other with the bearing unit 46 therebetween. The magnet 44a is longer than the magnet 44b in a direction parallel to a rotation axis 48 and the magnet 44d is longer than the magnet 44c in a direction parallel to the rotation axis 48. The magnet 44a is arranged to oppose a part of the magnet 44d and the magnet 44c and the magnet 44b is arranged to oppose a part of the magnet 44d. A shaft connected to the rotor 40 is arranged in the bearing unit 46 such that its center coincides with the rotation axis 48.

Figures 1, 6:
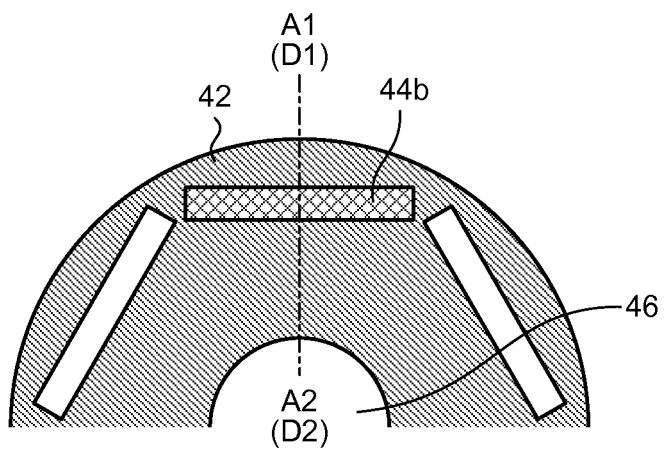
Figures 2, 6:
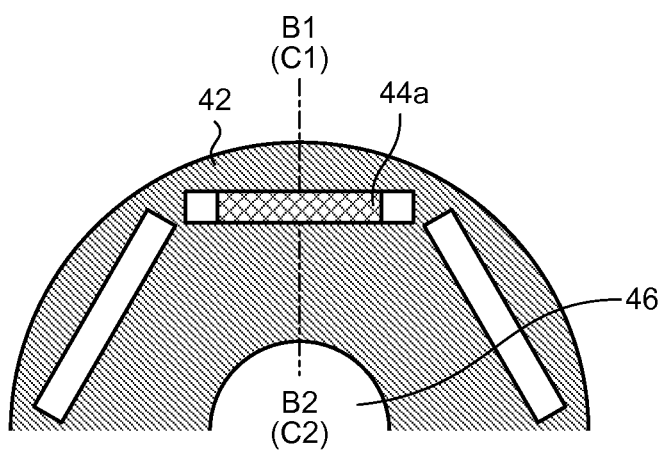

FIG. 6-1 is a diagram illustrating a cross-sectional view of the surface perpendicular to the rotation axis 48 taken along lines A1-A2 and D1-D2 in FIG. 5. FIG. 6-2 is a diagram illustrating a cross-sectional view of the surface perpendicular to the rotation axis 48 taken along lines B1-B2 and C1-C2 in FIG. 5.

In the cross-sectional view in FIG. 6-1, the width of the magnet 44b is larger than the width of the magnet 44d. In the cross-sectional view in FIG. 6-2, the width of the magnet 44c is larger than the width of the magnet 44a.

As described above, each of the length in the rotation axis direction and the width in the surface perpendicular to the rotation axis is made different in the opposed magnets; therefore, the magnetic field becomes imbalanced in a direction perpendicular to the rotation axis 48 of the rotor 40. By making the magnetic field imbalanced in such a manner and thereby making the difference between the magnetic forces and the difference between the forces that deflect the shaft arranged in the bearing unit 46 equal to each other, the force acting on the entire rotating portion can be balanced. Therefore, the shaft can be prevented from being deflected when a refrigerant is compressed while suppressing a reduction in the amount of effective magnetic flux and thus vibration and noise generated by torque variation can be suppressed.

Specific positions at which the magnets 44a to 44d are arranged can be determined in accordance with the load acting on the shaft when the motor is rotationally driven.

As described above, according to the present embodiment, it is possible to obtain a compressor in which the force acting on the entire rotating portion can be balanced even without a balance weight while suppressing a reduction in the amount of effective magnetic flux and thus vibration and noise when it is operating can be suppressed. Moreover, because a balance weight is not provided, cost reduction and saving of resources can be realized.

Fourth Embodiment

In the present embodiment, an explanation will be given, with reference to FIG. 7 to FIG. 9, of the configuration of a heat pump device that includes the motor that includes the rotor explained in the first to third embodiments.

Figure 7:
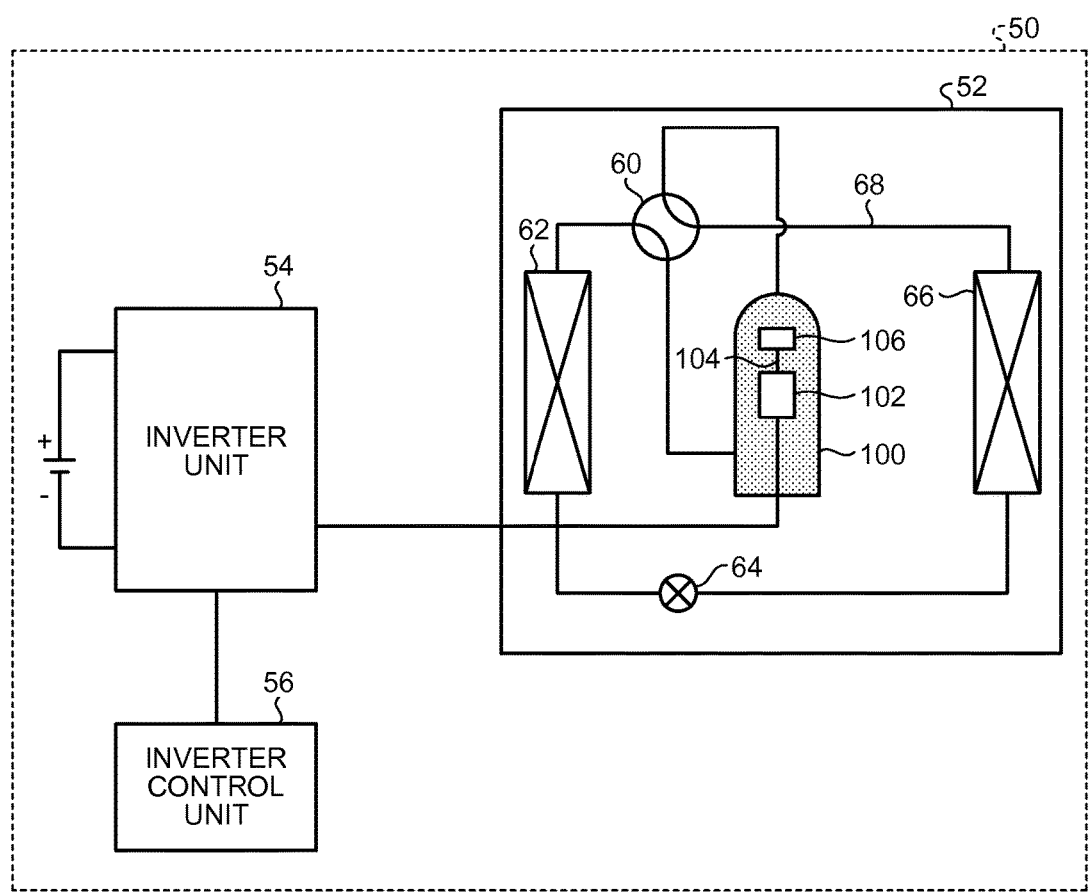
FIG. 7 is a diagram illustrating an example of the configuration of a heat pump device according to a fourth embodiment.

FIG. 7 is a diagram illustrating a heat pump device 50 that is an example of the configuration of the heat pump device in the present embodiment. The heat pump device 50 illustrated in FIG. 7 includes a refrigeration cycle unit 52, an inverter unit 54, and an inverter control unit 56. The heat pump device 50 is, for example, used in an air conditioner or a freezing machine.

The refrigeration cycle unit 52 includes the compressor 100, a four-way valve 60, a heat exchanger 62, an expansion mechanism 64, and a heat exchanger 66, which are connected together via a refrigerant pipe 68.

As explained in the first embodiment, the compressor 100 includes therein the compression unit 106 and the motor 102 (see FIG. 3).

The inverter unit 54 is electrically connected to the motor 102 and supplies AC power to drive the motor 102. It is satisfactory if the power source of the inverter unit 54 can supply DC power, and the power source of the inverter unit 54 may be a solar cell, an AC power source provided with a rectifier, or the like.

The inverter control unit 56 is electrically connected to the inverter unit 54. The inverter control unit 56 generates inverter drive signals (for example, PWM (Pulse Width Modulation) signals) on the basis of the necessary amount of refrigerant compression of the compressor 100 and outputs the inverter drive signals to the inverter unit 54.

Next, an explanation will be give of an apparatus (such as an air conditioner or a freezing machine) in which a heat pump device including the compressor explained in the first to third embodiments is used.

Figures 1, 8:
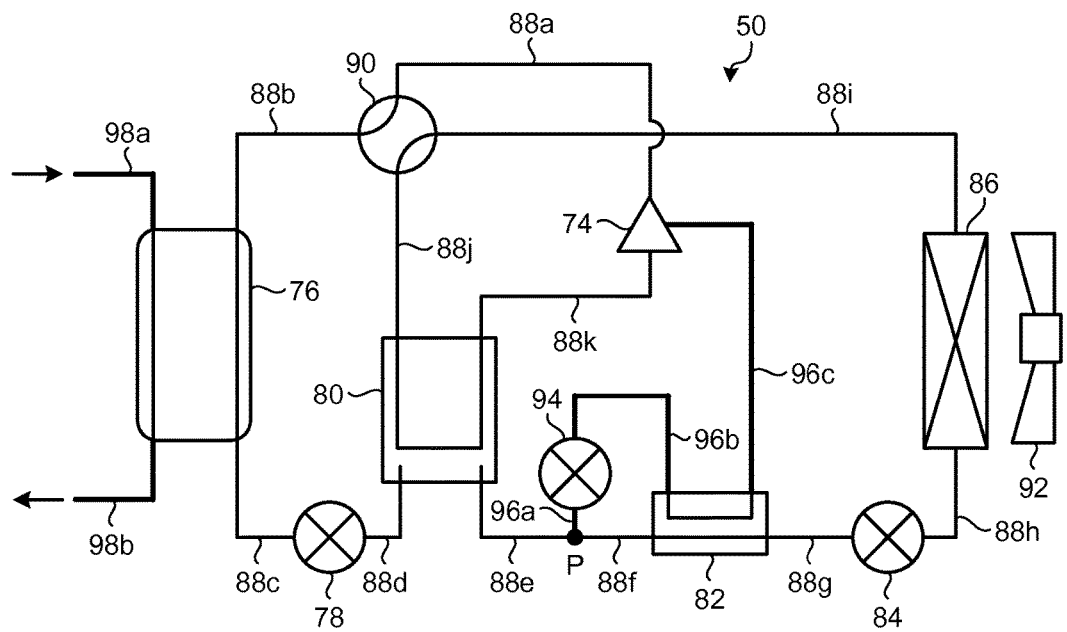
Figures 2, 8:
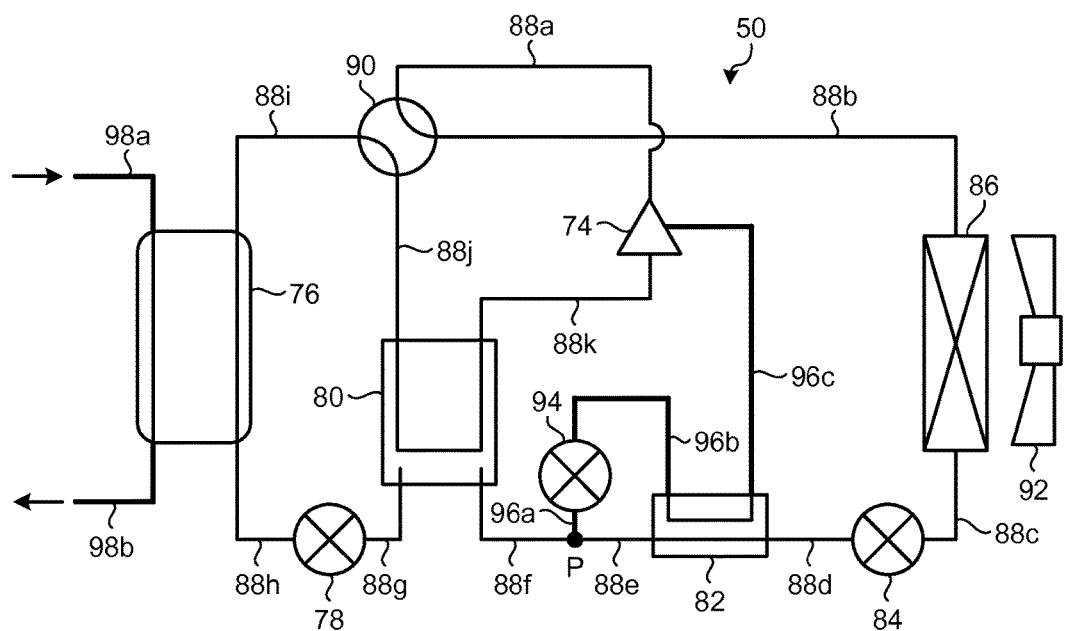

FIG. 8-1 and FIG. 8-2 are diagrams illustrating an example of the configuration of an apparatus that includes the heat pump device 50. FIG. 8-1 illustrates an example of the configuration during a heating operation and FIG. 8-2 illustrates an example of the configuration during a cooling operation. The circulation direction in which a refrigerant circulates in FIG. 8-1 is different from that in FIG. 8-2, and the circulation direction is switched by a four-way valve 90, which will be described later. FIG. 9 is a Mollier diagram of the state of a refrigerant in the heat pump device 50 illustrated in FIG. 8-1 and FIG. 8-2. In FIG. 9, the horizontal axis indicates the specific enthalpy h and the vertical axis indicates the refrigerant pressure P.

A compressor 74, a heat exchanger 76, an expansion mechanism 78, a receiver 80, an internal heat exchanger 82, an expansion mechanism 84, and a heat exchanger 86 are connected together by a pipe, thereby constituting a main refrigerant circuit in which a refrigerant circulates through the pipe. In each of FIG. 8-1 and FIG. 8-2, the main refrigerant circuit is divided into main refrigerant circuits 88*a* to 88*k*. The four-way valve 90 is provided on the discharge side of the compressor 74; therefore, the circulation direction of the refrigerant can be switched. A fan 92 is provided near the heat exchanger 86.

The compressor 74 corresponds to the compressor 100 in FIG. 7 and includes the motor 102 driven by the inverter unit 54 and the compressor unit 106. The compressor unit 106 and the motor 102 are connected by the crankshaft 104. Furthermore, the heat pump device 50 includes injection circuits 96*a* to 96*c* (represented by solid lines) that connect from between the receiver 80 and the internal heat exchanger 82 to the injection pipe of the compressor 74. An expansion mechanism 94 and the internal heat exchanger 82 are connected to the injection circuits 96*a* to 96*c*.

A water circuit (represented by a solid line) configured from a water circuit 98*a* and a water circuit 98*b* is connected to the heat exchanger 76, and water is circulated in the water circuit. A device that uses water, such as a hot water dispenser or a radiator included in floor heating or the like, is connected to the water circuit 98*a* and the water circuit 98*b*.

Next, an operation of the heat pump device 50 will be explained. First, an explanation will be given of an operation of the heat pump device 50 during a heating operation (when the heat pump device 50 operates as a hot water dispenser) with reference to FIG. 8-1.

Figure 9:
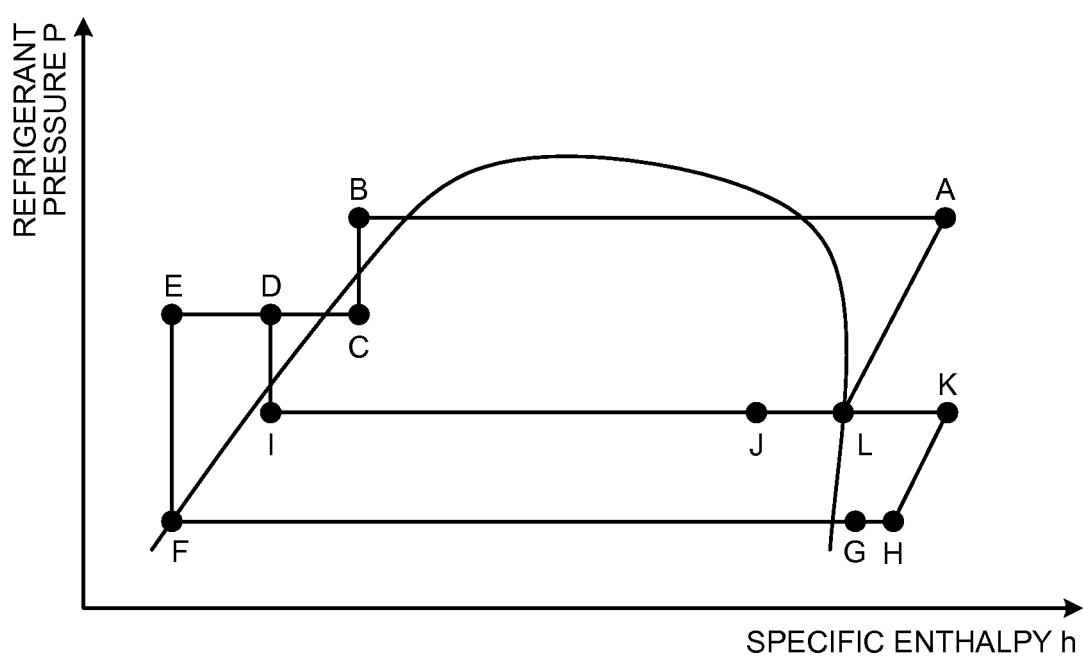
FIG. 9 is a Mollier diagram of a refrigerant in the heat pump device illustrated in FIG. 8-1 and FIG. 8-2 according to the fourth embodiment.

First, a refrigerant in a gas phase state is compressed in the compressor 74 and enters a high-temperature and high-pressure state (at point A in FIG. 9).

Then, the refrigerant in a high-temperature and high-pressure state is discharged from the compressor 74 to the main refrigerant circuit 88*a*. The refrigerant in the main refrigerant circuit 88*a* is transferred to the four-way valve 90 and the refrigerant in the main refrigerant circuit 88*b* transferred via the four-way valve 90 is transferred to the heat exchanger 76. The refrigerant transferred from the main refrigerant circuit 88*b* exchanges heat in the heat exchanger 76 so as to be cooled and liquefied (at point B in FIG. 9). In other words, the heat exchanger 76 functions as a condenser and as a radiator in the main refrigerant circuit. At this point, the water in the water circuit 98*a* is heated by the heat radiated from the refrigerant in the main refrigerant circuit. The heated water in the water circuit 98*b* is used for heating, hot-water supply, and the like.

The refrigerant in the main refrigerant circuit 88*c* that is liquefied in the heat exchanger 76 is transferred to the expansion mechanism 78 and is decompressed in the expansion mechanism 78 so as to enter a gas-liquid two-phase state (at point C in FIG. 9).

The refrigerant in the main refrigerant circuit 88*d* that has entered a gas-liquid two-phase state is transferred to the receiver 80 and exchanges heat, in the receiver 80, with the refrigerant (refrigerant to be transferred to the main refrigerant circuit 88*k* from the main refrigerant circuit 88*j*) to be transferred to the compressor 74 so as to be cooled and liquefied (at point D in FIG. 9).

The refrigerant in the main refrigerant circuit 88*e* that is liquefied in the receiver 80 is divided between the main refrigerant circuit 88*f* and the injection circuit 96*a* at point P in FIG. 8-1. The refrigerant flowing into the internal heat exchanger 82 from the main refrigerant circuit 88*f* exchanges heat, in the internal heat exchanger 82, with the refrigerant to be transferred to the injection circuit 96*c* from the injection circuit 96*b* so as to be further cooled (at point E in FIG. 9). The refrigerant flowing in the injection circuit 96*b* has been decompressed in the expansion mechanism 94 and is thus in a gas-liquid two-phase state.

The refrigerant in the main refrigerant circuit 88*g* that is cooled in the internal heat exchanger 82 is transferred to the expansion mechanism 84 so as to be decompressed and enters a gas-liquid two-phase state (at point F in FIG. 9).

The refrigerant in the main refrigerant circuit 88*h* that has entered a gas-liquid two-phase state in the expansion mechanism 84 is transferred to the heat exchanger 86 and exchanges heat with the outside air in the heat exchanger 86 so as to be heated (at point G in FIG. 9). In other words, the heat exchanger 86 functions as an evaporator in the main refrigerant circuit.

The refrigerant in the main refrigerant circuit 88*i* that is heated in the heat exchanger 86 is transferred to the four-way valve 90. The refrigerant in the main refrigerant circuit 88*j* that is transferred via the four-way valve 90 is transferred to the receiver 80 and is further heated in the receiver 80 (at point H in FIG. 9), and the heated refrigerant in the main refrigerant circuit 88*k* is transferred to the compressor 74.

Meanwhile, the refrigerant in the injection circuit 96*a* divided at point P (injection refrigerant (at point D in FIG. 9)) is decompressed in the expansion mechanism 94 (at point I in FIG. 9). The decompressed refrigerant in the injection circuit 96*b* exchanges heat in the internal heat exchanger 82 and enters a gas-liquid two-phase state (at point J in FIG. 9). The refrigerant in the injection circuit 96*c* that has exchanged heat in the internal heat exchanger 82 is transferred into the compressor 74 from the injection pipe of the compressor 74.

In the compressor 74, the refrigerant from the main refrigerant circuit 88*k* (at point H in FIG. 9) is compressed to an intermediate pressure and heated (at point K in FIG. 9). The refrigerant from the main refrigerant circuit 88*k* that is compressed to an intermediate pressure and heated joins the refrigerant in the injection circuit 96*c* (at point J in FIG. 9); therefore, the temperature of the refrigerant from the main refrigerant circuit 88*k* is reduced (at point L in FIG. 9). Then, the refrigerant having a reduced temperature (at point L in FIG. 9) is further compressed and heated by the compressor 74 so as to have a high temperature and a high pressure (at point A in FIG. 9), and is discharged to the main refrigerant circuit 88*a* from the compressor 74.

The heat pump device 50 may not perform the injection operation. If the injection operation is not performed, it is satisfactory if the expansion mechanism 94 is closed so as not to cause the refrigerant to flow into the injection pipe of the compressor 74. The aperture of the expansion mechanism 94 may be controlled by using a microcomputer or the like.

Next, an explanation will be given of an operation of the heat pump device 50 during a cooling operation (when the heat pump device 50 operates as a freezing machine) with reference to FIG. 8-2.

First, a refrigerant in a gas phase state is compressed in the compressor 74 and enters a high-temperature and high-pressure state (at point A in FIG. 9).

Then, the refrigerant in a high-temperature and high-pressure state is discharged from the compressor 74 to the main refrigerant circuit 88*a* and is transferred to the main refrigerant circuit 88*b* via the four-way valve 90. The refrigerant in the main refrigerant circuit 88*b* that is transferred via the four-way valve 90 is transferred to the heat exchanger 86. The refrigerant transferred from the main refrigerant circuit 88*b* exchanges heat in the heat exchanger 86 so as to be cooled and liquefied (at point B in FIG. 9). In other words, the heat exchanger 86 functions as a condenser and as a radiator in the main refrigerant circuit.

The refrigerant in the main refrigerant circuit 88c that is liquefied in the heat exchanger 86 is transferred to the expansion mechanism 84 and is decompressed so as to enter a gas-liquid two-phase state (at point C in FIG. 9).

The refrigerant in the main refrigerant circuit 88d that has entered a gas-liquid two-phase state is transferred to the internal heat exchanger 82 and exchanges heat, in the internal heat exchanger 82, with the refrigerant to be transferred to the injection circuit 96c from the injection circuit 96b so as to be cooled and liquefied (at point D in FIG. 9). The refrigerant transferred from the injection circuit 96b has been decompressed in the expansion mechanism 94 and is thus in a gas-liquid two-phase state (at point I in FIG. 9). The refrigerant (at point D in FIG. 9) in the main refrigerant circuit 88e that has exchanged heat in the internal heat exchanger 82 is divided between the main refrigerant circuit 88f and the injection circuit 96a at point P in FIG. 8-2.

In the receiver 80, the refrigerant in the main refrigerant circuit 88f exchanges heat with the refrigerant to be transferred to the main refrigerant circuit 88k from the main refrigerant circuit 88j so as to be further cooled (at point E in FIG. 9).

The refrigerant in the main refrigerant circuit 88g that is cooled in the receiver 80 is decompressed in the expansion mechanism 78 and enters a gas-liquid two-phase state (at point F in FIG. 9).

The refrigerant in the main refrigerant circuit 88h that has entered a gas-liquid two-phase state in the expansion mechanism 78 exchanges heat in the heat exchanger 76 so as to be heated (at point G in FIG. 9). At this point, the water in the water circuit 98a is cooled and the cooled water in the water circuit 98b is used for cooling or refrigeration. In other words, the heat exchanger 76 functions as an evaporator in the main refrigerant circuit.

The refrigerant in the main refrigerant circuit 88i that is heated in the heat exchanger 76 is transferred via the four-way valve 90. The refrigerant in the main refrigerant circuit 88j that is transferred via the four-way valve 90 flows into the receiver 80 and is further heated (at point H in FIG. 9). The refrigerant in the main refrigerant circuit 88k that is heated in the receiver 80 is transferred to the compressor 74.

Meanwhile, the refrigerant in the injection circuit 96a divided at point P in FIG. 8-2 is decompressed in the expansion mechanism 94 (at point I in FIG. 9). The refrigerant in the injection circuit 96b that is decompressed in the expansion mechanism 94 exchanges heat in the internal heat exchanger 82 and enters a gas-liquid two-phase state (at point J in FIG. 9). The refrigerant in the injection circuit 96c that has exchanged heat in the internal heat exchanger 82 is transferred into the compressor 74 from the injection pipe of the compressor 74. The subsequent compression operation performed in the compressor 74 is similar to that during the heating operation. In other words, the refrigerant that has entered a high-temperature and high-pressure state through compression and heating (at point A in FIG. 9) is discharged from the compressor 74 to the main refrigerant circuit 88a.

If the injection operation is not performed, it is satisfactory if the expansion mechanism 94 is closed so as not to cause the refrigerant to flow into the injection pipe of the compressor 74. The aperture of the expansion mechanism 94 may be controlled by using a microcomputer or the like.

In the above explanations, the heat exchanger 76 has been explained as a heat exchanger (for example, a plate type heat exchanger) that exchanges heat between a refrigerant in the main refrigerant circuit and water in the water circuit. However, the heat exchanger 76 is not limited thereto and may be a heat exchanger that exchanges heat between a refrigerant and air. A fluid other than water may be circulated in the water circuit.

As described above, the heat pump device in the present embodiment can be used in an air conditioner, a heat pump water heater, a refrigerator, a freezing machine, and the like.

The invention claimed is:

1. A compressor comprising:
   a motor that includes a rotor including opposed magnets;
   a compression unit that compresses a refrigerant; and
   a crankshaft that is connected to the motor and the compression unit and is configured to transmit rotational driving of the motor to the compression unit,
   wherein
   the rotor includes a plurality of the magnets having different magnetic forces or different lengths in a direction of a rotation axis of the rotor,
   when the magnets have different magnetic forces, a magnet having a lower magnetic force among the magnets is arranged to oppose a magnet having a higher magnetic force among the magnets,
   when the magnets have different lengths, a magnet having a smaller length among the magnets is arranged to oppose a magnet having a larger length among the magnets,
   a first magnet and a second magnet are arranged in parallel, and the first magnet and the second magnet form one pair of adjacent magnets among the plurality of the magnets,
   the first magnet and the second magnet are arranged to be displaced from each other in a direction parallel to the rotation axis,
   the first magnet has a portion that is not opposed to the second magnet, and
   the second magnet has a portion that is not opposed to the first magnet.

2. The compressor according to claim 1, wherein a difference in magnetic force between the opposed magnets eliminates a force that deflects the crankshaft when the motor is rotationally driven.

3. A heat pump device comprising the compressor according to claim 1.

4. An air conditioner comprising the heat pump device according to claim 3.

5. A freezing machine comprising the heat pump device according to claim 3.

6. The compressor according to claim 1, wherein the portion of the first magnet that is not opposed to the second magnet extends from a remainder of the first magnet in a first direction of the rotation axis, and the portion of the second magnet that is not opposed to the first magnet extends from a remainder of the second magnet in a second direction of the rotational axis, wherein the first direction of the rotation axis is opposite to the second direction of the rotation axis.

* * * * *